United States Patent
Ptak et al.

(10) Patent No.: US 7,258,112 B1
(45) Date of Patent: Aug. 21, 2007

(54) REDUCING HC COLLECTION IN A DIESEL PARTICULATE FILTER DURING FAILURE IN AN ENGINE COLD START AID

(75) Inventors: Richard Ptak, Woodstock, IL (US); Robert A. Schmidt, Hoffman Estates, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/555,270

(22) Filed: Oct. 31, 2006

(51) Int. Cl.
    *F02D 41/06* (2006.01)
(52) U.S. Cl. .............................. 123/685; 123/142.5 E; 123/179.16
(58) Field of Classification Search ................ 123/685, 123/179.16, 142.5 E
See application file for complete search history.

(56) References Cited

U.S. PATENT DOCUMENTS

| | | | | |
|---|---|---|---|---|
| 4,352,346 A | * | 10/1982 | Osano et al. | 123/179.16 |
| 5,483,946 A | * | 1/1996 | Hamburg et al. | 123/686 |
| 5,893,349 A | * | 4/1999 | Rado | 123/685 |
| 6,481,428 B1 | * | 11/2002 | Makki et al. | 123/685 |
| 6,978,759 B2 | * | 12/2005 | Iriya et al. | 123/179.16 |

* cited by examiner

*Primary Examiner*—Erick Solis
(74) *Attorney, Agent, or Firm*—Susan L. Lukasik; Elias P. Soupos; Jeffrey P. Calfa

(57) ABSTRACT

An engine (10) and a method of operating it during cold start and ensuing running using a cold start aid such as a glow plug control (24) and glow plugs (22). The control (24) monitors all glow plugs to distinguish between one that is effective and one that is ineffective. When a glow plug is disclosed to be ineffective, the engine control system (14) reduces the quantity of fuel introduced into the respective combustion chamber (12) in comparison to the quantity of fuel that would be introduced were the respective glow plug effective. This is beneficial in keeping the collection of hydrocarbons of surfaces of a diesel particulate filter (20) from increasing due to an ineffective glow plug.

17 Claims, 1 Drawing Sheet

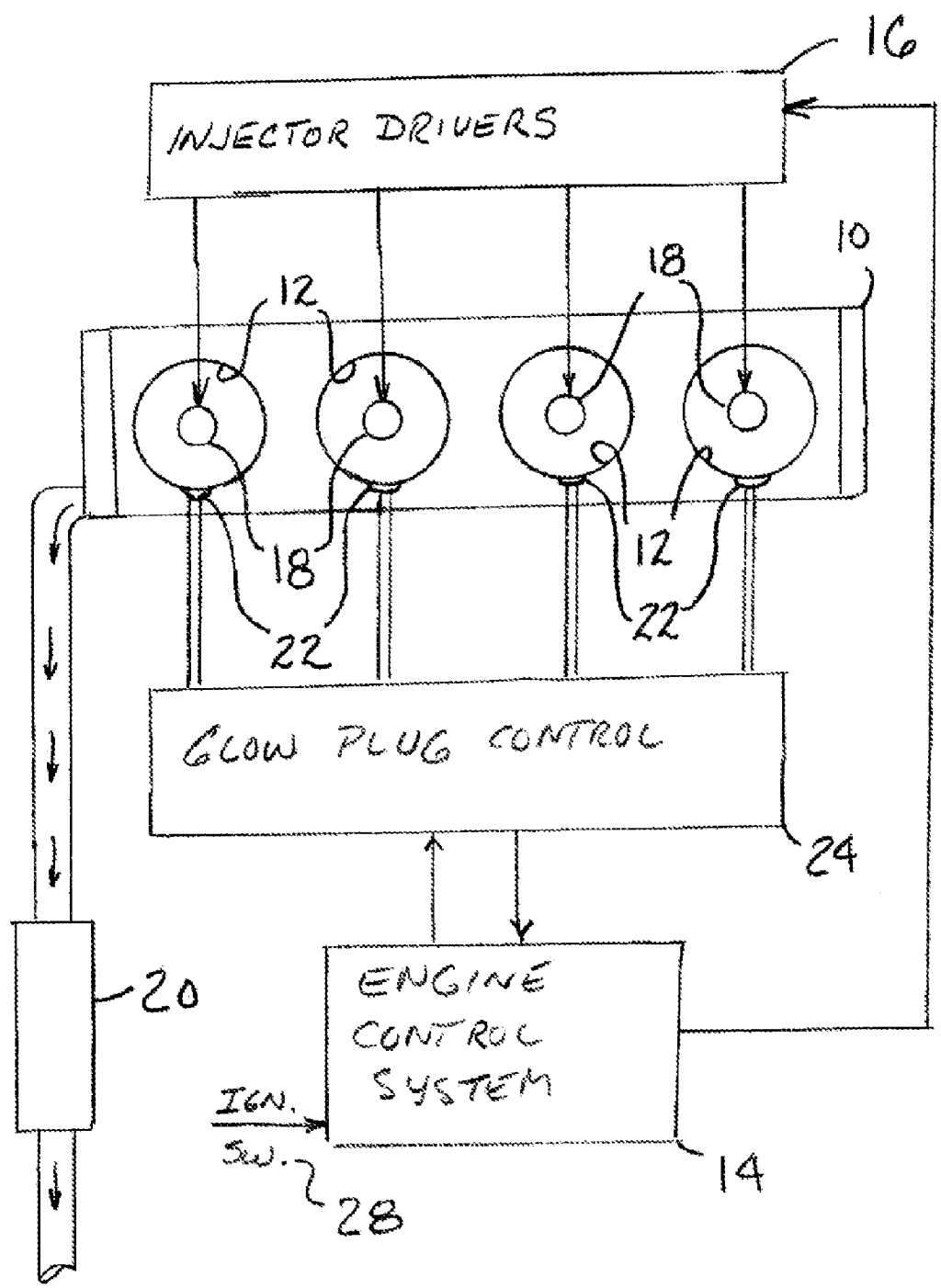

REDUCING HC COLLECTION IN A DIESEL PARTICULATE FILTER DURING FAILURE IN AN ENGINE COLD START AID

FIELD OF THE INVENTION

This invention relates to compression ignition engines that have cold start aids, such as glow plugs, for aiding engine starting when combustion chambers are cold. More specifically the invention relates to a system and method for reducing the amount of hydrocarbons (HC) in exhaust when an ineffective glow plug is detected, thereby reducing the accumulation of HC film in a diesel particulate filter (DPF) in the exhaust after-treatment system immediately after starting.

BACKGROUND OF THE INVENTION

Diesel engines in certain motor vehicles often use a starting aid, particularly when engine starting is attempted in cold weather. The starting aid is employed until sufficient heat has been developed in the combustion chambers for assured combustion of injected diesel fuel by compression ignition. In the absence of using a starting aid during a cold start, in-cylinder combustion may be incomplete or not occur at all, leading to increased hydrocarbon tailpipe emissions in the engine exhaust if the engine can be started and continues running.

Known cold start aids include ether injection, block heating, and glow plugs. Glow plugs are electrically energized to heat the combustion chambers to aid combustion of injected diesel fuel. The glow plugs may continue to be energized during initial running of the engine until desired combustion chamber temperature has been reached.

A glow plug starting aid system typically has one or more glow plugs associated with each combustion chamber, and some form of control or control system that controls the delivery of electric current to the glow plugs from the vehicle battery or battery bank. The control may comprise one or more switching devices, such as relays or solid-state power switches, through which battery current is conducted to the glow plugs.

When a cold engine is to be started, the one or more switching devices are turned on to connect the glow plugs to the battery, with the electric current acting to heat the glow plugs which in turn heat the combustion chambers. The engine is thereafter cranked until it starts and begins running under its own power.

At starting and initial running of a cold diesel engine, noticeably more HC is generated in the exhaust than later on. When an engine has a DPF in its exhaust system, the DPF is effective to trap significant amounts of DPM, keeping the trapped matter from entering the atmosphere. The HC that is created as a result of incomplete combustion in a cold combustion chamber can collect on surfaces of a DPF. A consequence of this is that the DPF may require more frequent regeneration.

Certain government regulations applicable to diesel engines mandate that an ineffective glow plug be disclosed, such as by illuminating a lamp on an instrument panel. The ineffectiveness may occur for any of several reasons. The glow plug itself may malfunction. A switching device through which electricity is delivered to a glow plug may not be functioning properly. There may a fault in the glow plug control and/or associated wiring.

While the expectation from having a fault indicator like an instrument panel lamp is that corrective action will be promptly undertaken by the vehicle operator, corrective action may be delayed.

SUMMARY OF THE INVENTION

The inventors have observed that a malfunction that causes a glow plug to be ineffective can have significant effect on the amount of HC being generated in engine exhaust when it becomes necessary for the glow plug system to be used to aid starting of a cold engine. Increases in HC collected on DPF surfaces may necessitate more frequent DPF regeneration.

In order to avoid increased collection of HC that may lead to a need for more frequent DPF regeneration, it becomes desirable to address the issue of a cold start aid malfunction other than by merely illuminating an instrument panel lamp. The present invention seeks to avoid increases in collection of HC on DPF surfaces due to such a malfunction without having to depend on the diligence of operator of the vehicle to correct it upon the malfunction being indicated by a signal such as illumination of an instrument panel lamp.

Known glow plug systems have the capability to identify any glow plug that is ineffective when the glow plug system is being used. The present invention utilizes that capability to implement a solution via software in the engine control system. The software utilizes the disclosure of an ineffective glow plug to fuel the respective engine cylinder differently from cylinders whose glow plugs are disclosed to be effective when the cold start aid is being used.

Fueling is modified in any of several ways. The quantity of fuel introduced into the cylinder whose glow plug is disclosed as ineffective can be made equal to a lesser quantity that is appropriate for a warm engine. Or the value of a multiplier used to calculate a quantity that would be introduced were the glow plug disclosed as effective can be reduced. Or fueling can be prohibited.

One generic aspect of the present invention relates to an internal combustion engine comprising multiple combustion chambers and a cold start aid for aiding combustion of fuel in the combustion chambers when the engine is started cold and upon starting continues running.

The cold start aid comprises multiple start aid devices each associated with a respective combustion chamber for aiding combustion in the respective combustion chamber when the cold start aid is used.

A respective signal is associated with each start aid device for distinguishing between effectiveness and ineffectiveness of the respective start aid device for aiding combustion.

A fueling system comprises multiple fueling devices each associated with a respective combustion chamber for introducing fuel into the respective combustion chamber.

When the respective signal discloses ineffectiveness of the respective start aid device for aiding combustion, a control system reduces the quantity of fuel introduced into the respective combustion chamber in comparison to the quantity of fuel that would be introduced into the respective combustion chamber when the respective signal discloses effectiveness of the respective start aid device for aiding combustion.

Another generic aspect relates to a method of operating an internal combustion engine during cold start and ensuing running using a cold start aid comprising multiple start aid devices each associated with a respective combustion chamber of the engine for aiding combustion in the respective combustion chamber.

The method comprises distinguishing between a respective start aid device being effective and ineffective for aiding combustion. When the respective start aid device is disclosed to be ineffective for aiding combustion, the quantity of fuel introduced into the respective combustion chamber is reduced in comparison to the quantity of fuel that would be introduced into the respective combustion chamber were the respective start aid device disclosed to be effective for aiding combustion.

Still another generic aspect relates to a method of reducing the accumulation of hydrocarbons on surfaces of a diesel particulate filter in an exhaust system of a compression ignition engine during engine cold start and ensuing running due to ineffectiveness of a start aid device in an engine cold start aid to heat a respective cold combustion chamber.

The engine comprises multiple such devices each associated with a respective combustion chamber of the engine for aiding combustion in the respective combustion chamber when cold.

The method comprises distinguishing between each respective start aid device being effective and ineffective for aiding combustion, and when a respective start aid device is disclosed to be ineffective for aiding combustion, reducing the quantity of fuel introduced into the respective combustion chamber in comparison to the quantity of fuel that would be introduced into the respective combustion chamber were the respective start aid device disclosed to be effective for aiding combustion.

The foregoing, along with further features and advantages of the invention, will be seen in the following disclosure of a presently preferred embodiment of the invention depicting the best mode contemplated at this time for carrying out the invention. This specification includes a drawing, now briefly described as follows.

BRIEF DESCRIPTION OF THE DRAWINGS

FIG. 1 is schematic diagram of portions of a motor vehicle engine and associated systems, including a cold start aid, relevant to principles of the present invention.

DESCRIPTION OF THE PREFERRED EMBODIMENT

FIG. 1 shows a compression ignition engine 10 and associated systems relevant to principles of the invention. Engine 10 comprises multiple combustion chambers 12, typically six or eight when engine 10 is used as the powerplant of a motor vehicle like a truck. Only four combustion chambers are shown in the FIGURE. Diesel fuel is injected into combustion chambers 12 by a fuel injection system to ignite under heat of compression by pistons that reciprocate within engine cylinders and thereby run the engine to propel the motor vehicle.

The fuel injection system is under the control of an engine control system 14 that acts through injector drivers 16 to operate individual fuel injectors 18 for the combustion chambers 12 in properly timed relation to the engine cycle to inject fuel into the cylinders. Injector drivers may be in a separate injector driver module or alternately part of engine control system 14.

Exhaust resulting from in-cylinder combustion is conveyed through an exhaust system that comprises an aftertreatment device, such as a diesel particulate filter (DPF) 20. DPF 20 filters diesel particulate matter from the exhaust before the exhaust can enter the surrounding atmosphere, but is prone to collecting HC generated by incomplete combustion occurring when the combustion chambers are cold.

To aid cold engine starting, engine 10 includes a glow plug system that has individual glow plugs 22 associated with combustion chambers 12 and a glow plug control 24 that is either integrated with the electrical system of the motor vehicle or is a separate unit, or module, that is connected into the electrical system.

An ignition switch 28 that is disposed in the cab of the vehicle for driver access cranks engine 10 at starting and allows the engine, once started, to continue running until turned off.

A glow plug system may be associated with engine control system 14 such that ignition switch 28 must have been placed in ON position for the glow plugs 22 to be energized, but the glow plugs may be energized in other ways depending on other control inputs.

A known glow plug control 24 comprises one or more switching devices through which battery current is delivered to the individual glow plugs 22. When proper input conditions have been satisfied, the switching devices are turned on, thereby connecting the glow plugs to the battery or batteries. The battery current delivered to the glow plugs heats them with the heat being transferred to the combustion chambers.

After some amount of heating time, which may be determined by control 24 and/or by the judgment of the driver, engine 10 can be fueled and cranked. With sufficient heating having been provided by the glow plug system, the engine should start without excessive cranking.

Certain malfunctions in the glow plug system however will not provide sufficient heating of one or more combustion chambers 12, and it is possible that repeated cranking will not be effective to start the engine.

A malfunction that affects only a small number of combustion chambers may not be severe enough to prevent the engine from starting. However, the engine may run rough, with combustion being incomplete and possibly even non-existent in affected combustion chambers.

A failure in a switching device in control 24 is one type of failure that can produce such an undesired outcome. A failed glow plug is another.

A consequence of a starting and then running the engine with a limited number of glow plugs being ineffective is that incomplete or non-existent combustion in the affected cylinders creates additional HC in the exhaust that tends to collect as a sticky film on surfaces of DPF 20. In order to reduce the amount of HC in exhaust when cranking is successful in starting the engine but a limited number of glow plugs are ineffective, the present invention reduces the quantity of fuel introduced into the affected cylinders. In other words, when the respective glow plug is disclosed to be ineffective for aiding combustion, whatever the cause, the quantity of fuel introduced into the respective combustion chamber is reduced in comparison to the quantity of fuel that would be introduced were the respective glow plug disclosed to be effective for aiding combustion.

The quantity of fuel introduced into a cylinder whose glow plug is disclosed as ineffective can be determined in any of several ways. For one it can be made equal to a quantity appropriate for a warmed engine, such as by eliminating a cold enrichment component. Another way is to reduce the value of a multiplier used to calculate a quantity that would be introduced were the glow plug disclosed as effective. Still another way is to prohibit fueling.

Control 24 has the ability to identify a glow plug that is not operating when it should be, an ability mandated by certain regulations already in effect. When a glow plug is identified as ineffective, control 24 communicates that information to engine control system 14, which then makes the proper fueling adjustment for the respective fuel injector 18. The fault detection strategy could alternately be contained in control system 14 instead of control 24.

As the engine continues to run, it will begin to warm. The reduced fueling to an affected cylinder can be discontinued when the engine has warmed to a certain temperature. Discontinuance may also be conditioned on the engine running substantially at low-idle speed or on driven wheels of the motor vehicle that are coupled to the engine through a drivetrain ceasing to draw torque from the engine. Such conditioning makes the resumption of normal fueling transparent to the driver.

Effectiveness of the invention has been demonstrated by testing under various test conditions. In one test, a single deteriorated glow plug that has reduced effectiveness, but not full ineffectiveness, was found to not have significant effect of HC generation at cold engine starting. In another test, a single glow plug that was ineffective was found to have significant negative effect on HC generation at cold engine starting, resulting in increased HC when fueling of the affected cylinder was not reduced. In still another test, a single glow plug that was ineffective was found to have significant positive effect on HC generation at cold engine starting, resulting in reduced HC when fueling of the affected cylinder was shut off.

With its capability of reducing fueling to a cylinder having an ineffective glow plug, the invention may facilitate compliance of an engine with applicable cold start aid regulations.

While a presently preferred embodiment of the invention has been illustrated and described, it should be appreciated that principles of the invention apply to all embodiments falling within the scope of the following claims.

What is claimed is:

1. An internal combustion engine comprising:
    multiple combustion chambers;
    a cold start aid for aiding combustion of fuel in the combustion chambers when the engine is started cold and upon starting continues running;
    the cold start aid comprising multiple start aid devices each associated with a respective combustion chamber for aiding combustion in the respective combustion chamber when the cold start aid is used;
    a signal associated with each start aid device for distinguishing between effectiveness and ineffectiveness of the respective start aid device for aiding combustion;
    a fueling system comprising multiple fueling devices each associated with a respective combustion chamber for introducing fuel into the respective combustion chamber; and
    a control system for reducing, in comparison to the quantity of fuel that would be introduced into a respective combustion chamber when the respective signal discloses effectiveness of the respective start aid device for aiding combustion, the quantity of fuel introduced into the respective combustion chamber when the respective signal discloses ineffectiveness of the respective start aid device for aiding combustion.

2. An engine as set forth in claim 1 wherein the start aid devices comprise glow plugs that when electrically energized generate heat in the combustion chambers to aid combustion, and the control system causes the reduction in quantity of fuel introduced into the respective combustion chamber when the respective signal discloses that the respective glow plug is not being electrically energized.

3. An engine as set forth in claim 1 wherein the control system prohibits a respective fueling device from introducing fuel into the respective combustion chamber when the respective signal discloses that the respective start aid device is ineffective for aiding combustion.

4. An engine as set forth in claim 1 wherein the control system causes a respective fueling device to introduce a quantity of fuel into the respective combustion chamber equal to a quantity appropriate for a warmed engine when the respective signal discloses that the respective start aid device is ineffective for aiding combustion.

5. An engine as set forth in claim 1 wherein when the respective signal discloses that the respective start aid device is ineffective for aiding combustion, the control system causes the respective fueling device to introduce a quantity of fuel into the respective combustion chamber by reducing the value of a multiplier used to calculate a quantity that would be introduced were the respective signal disclosing that the respective start aid device was effective for aiding combustion.

6. An engine as set forth in claim 1 further comprising an exhaust system containing an exhaust after-treatment device for preventing a significant portion of particulate matter in exhaust from reaching atmosphere.

7. An engine as set forth in claim 6 wherein the exhaust after-treatment device comprises diesel particulate filter that traps particulate matter.

8. A method of operating an internal combustion engine during cold start and ensuing running using a cold start aid comprising multiple start aid devices, each associated with a respective combustion chamber of the engine for aiding combustion in the respective combustion chamber, the method comprising:
    distinguishing between a respective start aid device being effective and ineffective for aiding combustion; and
    when the respective start aid device is disclosed to be ineffective for aiding combustion, reducing the quantity of fuel introduced into the respective combustion chamber in comparison to the quantity of fuel that would be introduced into the respective combustion chamber were the respective start aid device disclosed to be effective for aiding combustion.

9. A method as set forth in claim 8 wherein the step of distinguishing between a respective start aid device being effective and ineffective for aiding combustion comprises distinguishing between the respective start aid device being and not being electrically energized.

10. A method as set forth in claim 8 wherein the step of reducing the quantity of fuel introduced into the respective combustion chamber comprises prohibiting the respective fueling device from introducing fuel into the respective combustion chamber.

11. A method as set forth in claim 8 wherein the step of reducing the quantity of fuel introduced into the respective combustion chamber comprises introducing a quantity of fuel into the respective combustion chamber equal to a quantity appropriate for a fully warmed engine.

12. A method as set forth in claim 8 wherein the step of reducing the quantity of fuel introduced into the respective combustion chamber comprises reducing the value of a multiplier used to calculate a quantity that would be introduced were the respective start aid device being disclosed as effective for aiding combustion.

13. A method as set forth in claim 8 comprising discontinuing the step of reducing the quantity of fuel introduced into the respective combustion chamber when the engine has warmed to a certain temperature.

14. A method as set forth in claim 13 comprising also conditioning the discontinuance of reducing the quantity of fuel introduced into the respective combustion chamber on the engine running substantially at low-idle speed.

15. A method as set forth in claim 13 comprising also conditioning the discontinuance of reducing the quantity of fuel introduced into the respective combustion chamber on driven wheels of a motor vehicle coupled to the engine through a drivetrain ceasing to draw torque from the engine.

16. A method of reducing the accumulation of hydrocarbons on surfaces of a diesel particulate filter in an exhaust system of a compression ignition engine during engine cold start and ensuing running due to ineffectiveness of a start aid device in an engine cold start aid to heat a respective cold combustion chamber, the engine comprising multiple such devices each associated with a respective combustion chamber of the engine for aiding combustion in the respective combustion chamber when cold, the method comprising:

distinguishing between each respective start aid device being effective and ineffective for aiding combustion; and when a respective start aid device is disclosed to be ineffective for aiding combustion, reducing the quantity of fuel introduced into the respective combustion chamber in comparison to the quantity of fuel that would be introduced into the respective combustion chamber were the respective start aid device disclosed to be effective for aiding combustion.

17. A method as set forth in claim 16 wherein the step of distinguishing between each start aid device being effective and ineffective for aiding combustion comprises distinguishing between a respective start aid device being and not being electrically energized.

\* \* \* \* \*